US008351929B2

United States Patent
Izawa et al.

(10) Patent No.: US 8,351,929 B2
(45) Date of Patent: Jan. 8, 2013

(54) MOBILE STATION AND WIRELESS COMMUNICATION METHOD

(75) Inventors: Masaki Izawa, Osaka (JP); Keiichi Hirata, Osaka (JP)

(73) Assignee: KYOCERA Corporation, Kyoto (JP)

( * ) Notice: Subject to any disclaimer, the term of this patent is extended or adjusted under 35 U.S.C. 154(b) by 277 days.

(21) Appl. No.: 12/490,566

(22) Filed: Jun. 24, 2009

(65) Prior Publication Data

US 2009/0325574 A1 Dec. 31, 2009

(30) Foreign Application Priority Data

Jun. 26, 2008 (JP) ................................. 2008-167324

(51) Int. Cl.
*H04W 4/00* (2009.01)

(52) U.S. Cl. .................................. 455/432.1; 455/435.1

(58) Field of Classification Search ....... 455/432.1–453; 370/335
See application file for complete search history.

(56) References Cited

U.S. PATENT DOCUMENTS

| | | | | |
|---|---|---|---|---|
| 6,445,925 B1 * | 9/2002 | Kwon et al. | .................. | 455/446 |
| 6,452,912 B1 * | 9/2002 | Leem | ............................ | 370/335 |
| 6,564,055 B1 * | 5/2003 | Hronek | ......................... | 455/433 |
| 7,003,295 B1 * | 2/2006 | Cook et al. | ................. | 455/435.1 |
| 7,155,219 B2 | 12/2006 | Aerrabotu | | |
| 7,164,920 B2 | 1/2007 | Giacalone et al. | | |
| 7,603,119 B1 * | 10/2009 | Durig et al. | ................ | 455/432.3 |
| RE41,737 E * | 9/2010 | Leem | ............................ | 370/335 |
| 7,894,812 B1 * | 2/2011 | Durig et al. | ................ | 455/432.3 |
| 7,894,987 B1 * | 2/2011 | Tester et al. | ................... | 701/213 |
| 2004/0110503 A1 * | 6/2004 | Park | ........................... | 455/435.1 |
| 2005/0233693 A1 * | 10/2005 | Karaoguz et al. | ............ | 455/3.06 |
| 2005/0282544 A1 * | 12/2005 | Oommen et al. | .......... | 455/432.1 |
| 2007/0259646 A1 | 11/2007 | Hu et al. | | |
| 2009/0322597 A1 * | 12/2009 | Medina Herrero et al. | ........................ | 342/357.02 |
| 2010/0075669 A1 * | 3/2010 | Sparks et al. | ................. | 455/433 |

FOREIGN PATENT DOCUMENTS

| | | |
|---|---|---|
| JP | 2005-033378 | 2/2005 |
| JP | 2005532011 | 10/2005 |
| JP | 2006521770 | 9/2006 |
| WO | WO2006075399 A1 | 7/2006 |

OTHER PUBLICATIONS

Office Action issued in Japanese Patent Application No. 2008-167324 issued Jun. 17, 2010, Japanese language version and translation included, 5 pages.

* cited by examiner

*Primary Examiner* — Kamran Afshar
*Assistant Examiner* — Kashif Siddiqui
(74) *Attorney, Agent, or Firm* — Procopio, Cory, Hargreaves & Savitch LLP (57) ABSTRACT

A mobile station is provided. The mobile station includes: a wireless communication unit which establishes wireless communication with a base station; a storage unit which stores a roaming list used when roaming to a mobile communication network other than a specific mobile communication network; a communication network selecting unit which selects a mobile communication network with which the mobile station is capable of communicating wirelessly, by using the roaming list; and an update unit which requests update of the roaming list through the wireless communication unit at a time of starting the mobile station, and updates the roaming list stored in the storage unit if changed.

11 Claims, 6 Drawing Sheets

| CHANNEL | | |
|---|---|---|
| Index | type | Channel |
| 0 | CDMA | 50 |
| 1 | CDMA | 100 |
| 2 | CDMA | 150 |
| 3 | CDMA | 200 |
| – | – | – |
| – | – | – |

| MOBILE COMMUNICATION NETWORK | | | | | |
|---|---|---|---|---|---|
| Index | geography | type | Channel Index | SID | NID |
| 0 | New | 1x | 0 | 12345 | 0 |
| 1 | Same | 1x | 1 | 12346 | 0 |
| 2 | Same | 1x | 2 | 12347 | 0 |
| 3 | New | 1x | 3 | 12348 | 0 |
| – | – | – | – | – | – |
| – | – | – | – | – | – |

FIG. 4B

| CHANNEL | | |
|---|---|---|
| Index | type | Channel |
| 0 | CDMA | 50 |
| 1 | CDMA | 100 |
| 2 | CDMA | 150 |
| 3 | CDMA | 200 |
| 4 | CDMA | 250 |
| – | – | – |

| MOBILE COMMUNICATION NETWORK | | | | | |
|---|---|---|---|---|---|
| Index | geography | type | Channel Index | SID | NID |
| 0 | New | 1x | 0 | 12345 | 0 |
| 1 | Same | 1x | 1 | 12346 | 0 |
| 2 | Same | 1x | 2 | 12347 | 0 |
| 3 | New | 1x | 3 | 12348 | 0 |
| 4 | New | 1x | 4 | 12349 | 0 |
| – | – | – | – | – | – |

MOBILE STATION AND WIRELESS COMMUNICATION METHOD

CROSS-REFERENCE TO RELATED APPLICATION

This application claims priority from Japanese Patent Application No. 2008-167324, filed on Jun. 26, 2008, the entire subject matter of which is incorporated herein by reference.

BACKGROUND OF THE INVENTION

1. Field of the Invention

The present invention relates to a mobile station capable of roaming between mobile communication networks, and a wireless communication method.

2. Description of the Related Art

Recently, mobile stations such as mobile phones and Personal Hand phone System (PHS) have been widely used, and a phone call or access to information has become enabled irrespective of time and place. In addition, available regions of mobile stations have expanded, and a phone call or communication has become enabled anywhere at home and visiting using one mobile station.

There is a communication carrier for each area (service area) anywhere at home and visiting, and each communication carrier configures a mobile communication network. Among such mobile communication networks, it is possible to continue a wireless communication with so-called roaming in which a user can receive a same service as that provided by a communication carrier contracted with the user, by switching a communication method or the like. At the time of performing such roaming, a mobile communication network is specified in each area, and a roaming list having information for establishing wireless communication with the mobile communication network is used.

The user can acquire the above-described roaming list through BroadCast/MultiCast Services (BCMSC) for multicasting the same information from a base station to a plurality of mobile stations in an area, or through user's manual operation. A technique has been known in which a roaming list is acquired in the user's own country through e-mail or the like, an updated roaming list is read out without turning the power off, and a mobile communication system is detected, thereby immediately utilizing the update of the roaming list.

If a method of automatically updating a roaming list for all mobile stations through BCMCS or the like as described above is employed, there is a case in which the roaming list cannot be acquired at the updating time since a user turns off the power of a mobile station or the power is kept turned off in stock before selling. BCMCS is a one-way multicast from a communication carrier to mobile stations. Accordingly, there is a case in which the communication carrier side does not grasp an update state of a mobile station, a mobile station does not grasp an update failure and passes over a mobile communication network, and therefore, normal roaming cannot be performed.

Similarly, when update of roaming is performed by the user's own manual operation, the user might forget the update. In addition, for a user who does not recognize a roaming list itself, the update is not performed, and therefore, roaming cannot be performed normally.

To solve such a problem, it might be effective that the frequency of an automatic update by BCMCS is raised to reduce a chance of the update failure. However, update of a roaming list by BCMCS is unnecessarily repeated for a user having a mobile station in which a roaming list is normally updated, thereby resulting in unnecessary consumption of resource or unnecessary increase of the number of accesses.

SUMMARY OF THE INVENTION

The present invention has been made to solve the above circumstances. Accordingly, an aspect of the present invention is to provide a mobile station and a wireless communication method, by which update of a roaming list is performed easily and reliably in a circumstance where the power of the mobile station needs to be turned on or roaming is necessary, so that a roaming service can be normally received.

According to an exemplary embodiment of the present invention, there is provided a mobile station including: a wireless communication unit which establishes wireless communication with a base station; a storage unit which stores a roaming list used when roaming to a mobile communication network other than a specific mobile communication network; a communication network selecting unit which selects a mobile communication network with which the mobile station is capable of communicating wirelessly, by using the roaming list; and an update unit which requests update of the roaming list through the wireless communication unit at a time of starting the mobile station, and updates the roaming list stored in the storage unit if changed.

According to another exemplary embodiment of the present invention, there is provided a mobile station comprising: a wireless communication unit which establishes wireless communication with a base station; a storage unit which stores a roaming list used when roaming to a mobile communication network other than a specific mobile communication network; a communication network selecting unit which selects a mobile communication network with which the mobile station is capable of communicating wirelessly, by using the roaming list; a position detecting unit which detects a position of the mobile station; and an update unit which requests update of the roaming list through the wireless communication unit at a time of detecting that the position of the mobile station is within a predetermined area, and updates the roaming list stored in the storage unit if changed.

According to another exemplary embodiment of the present invention, there is provided a mobile station comprising: a wireless communication unit which establishes wireless communication with a base station; a storage unit which stores a roaming list used when roaming to a mobile communication network other than a specific mobile communication network; a communication network selecting unit which selects a mobile communication network with which the mobile station is capable of communicating wirelessly, by using the roaming list; and an update unit which updates the roaming list stored in the storage unit through the wireless communication unit in response to a roaming list updating instruction through wireless communication other than the mobile communication network.

According to another exemplary embodiment of the present invention, there is provided a mobile station comprising: a wireless communication unit which establishes wireless communication with a base station; a storage unit which stores a roaming list used when roaming to a mobile communication network other than a specific mobile communication network; a communication network selecting unit which selects a mobile communication network with which the mobile station is capable of communicating wirelessly, by using the roaming list; and an update unit which requests update of the roaming list through the wireless communication unit in response to a user input for changing into an off-line mode, and updates the roaming list stored in the storage unit if changed.

According to another exemplary embodiment of the present invention, there is provided a wireless communication method comprising: detecting a passing of a mobile station through a place to an area requiring roaming to a mobile communication network other than a specific mobile communication network; requesting a base station to update a roaming list used when roaming to a mobile communication network through a wireless communication unit of the mobile station which establishes wireless communication with the base station when the passing is detected; updating a roaming list of the mobile station if changed; storing the updated roaming list; and selecting a mobile communication network with which the mobile station is capable of communicating wirelessly, by using the stored roaming list at a time of roaming.

According to another exemplary embodiment of the present invention, there is provided a computer-readable medium having a computer program stored thereon and readable by a computer installed in a mobile station, the computer program, when executed by the computer, causes the computer to perform operations comprising: establishing wireless communication with a base station; storing a roaming list used when roaming to a mobile communication network other than a specific mobile communication network; selecting a mobile communication network with which the mobile station is capable of communicating wirelessly, by using the roaming list; and performing at least one of the following operations comprising: (a) requesting update of the roaming list at a time of starting the mobile station, and updating the roaming list if changed; (b) detecting a position of the mobile station, requesting update of the roaming list at a time of detecting that the position of the mobile station is within a predetermined area, and updating the roaming list if changed; (c) updating the roaming list in response to a roaming list updating instruction through wireless communication other than the mobile communication network; and (d) requesting update of the roaming list in response to a user input for changing into an off-line mode, and updating the roaming list if changed.

According to the above configuration, update of a roaming list is performed easily and reliably in a circumstance where the power of the mobile station needs to be turned on or roaming is necessary, so that a roaming service can be normally received.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

Hereinafter, exemplary embodiments according to the present invention will be described in detail with reference to the accompanying drawings. In the following description of the exemplary embodiments, sizes, materials, specific values, and the like are only examples for easily understanding the present invention, and do not limit the present invention, except for a particularly mentioned case. In the specification and drawings, the same reference numerals are given to element having substantially same functions and configurations, thereby omitting the overlapping description. In addition, elements having no direct relation to the present invention are not shown.

(Mobile Communication Network 100)

Figure 1:
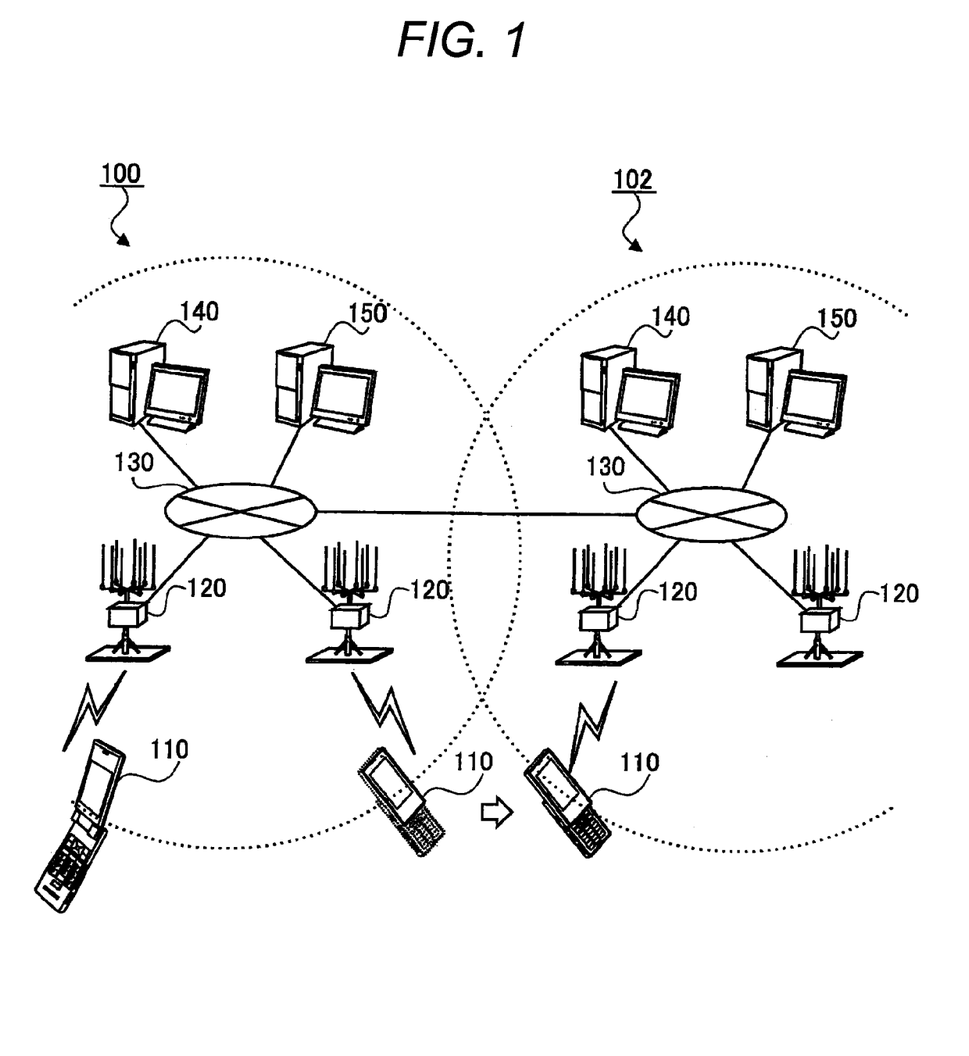
FIG. 1 is a diagram illustrating a schematic connection relationship of a mobile communication network according to an exemplary embodiment.

FIG. 1 is a diagram illustrating a schematic connection relationship of a mobile communication network 100. The mobile communication network 100 is operated by a communication carrier and includes mobile stations 110, base stations 120 that establishes the wireless connection with the mobile stations 110, a communication network 130 to which the base stations 120 is connected and including Integrated Services Digital Network (ISDN) lines, the Internet, private lines, and the like, a relay server 140 that relays the base stations 120 through the communication network 130, and a PRL multicast server 150. The mobile communication network 100 is also connected to another mobile communication network 102 operated by another communication carrier through the communication network 103. Similarly to the mobile communication network 100, the mobile communication network 102 includes mobile stations 110, base stations 120, a communication network 130, a relay server 140, and a PRL multicast server 150.

In each of the mobile communication networks 100 and 102, the mobile station 110 performs a phone call or communication with another mobile station through wireless communication with the base station 120 and communication connection by the relay server 140. In addition, the mobile station 110 can receive various services from a web server (not shown) of each service provider, to which the mobile station 110 is connected through the communication network 130.

In this exemplary embodiment, at the time of performing roaming, for example, when the mobile station 110 is moved from the mobile communication network 100 to the mobile communication network 102, the mobile communication network 102 as a destination is specified, and a roaming list, which is referred to as Preferred Roaming List (PRL), as information for establishing wireless communication with the mobile communication network 102 is acquired from the PRL multicast server 150 through the mobile communication network 100. The PRL includes a plurality of mobile communication networks in which the mobile station 110 is capable of performing communication technically and allowed to perform communication contractually, listed therein. A specification of the PRL is defined by IS-638 standard, in which identifiers of communication networks, channel numbers, priorities thereof, and the like are stored to be associated with each other.

The mobile station 110 acquires the mobile communication network 100 of a specific communication carrier contracted therewith on the basis of the PRL, and establishes communication according to a communication method of the acquired mobile communication network 100. When the mobile station 110 is moved to the other mobile communication network 102 and thus misses the base station 120 of the communicating mobile communication network 100, the mobile station 110 selects one channel in the PRL and tries communication establishment with the mobile communication network 102 associated with the selected channel.

Accordingly, even if the mobile communication network 102 operated by the other communication carrier different from the specific communication carrier contracted with the mobile station 110, it is possible to receive the similar service as that of the mobile communication network 100 operated by the specific communication carrier contracted with the mobile station 110.

Hereinafter, a detailed configuration of the mobile station 110 capable of receiving a normal roaming service by easily and reliably updating the PRL will be described, and then a wireless communication method of the mobile station 110 will be described in detail.

(Mobile Station 110)

Figure 2:
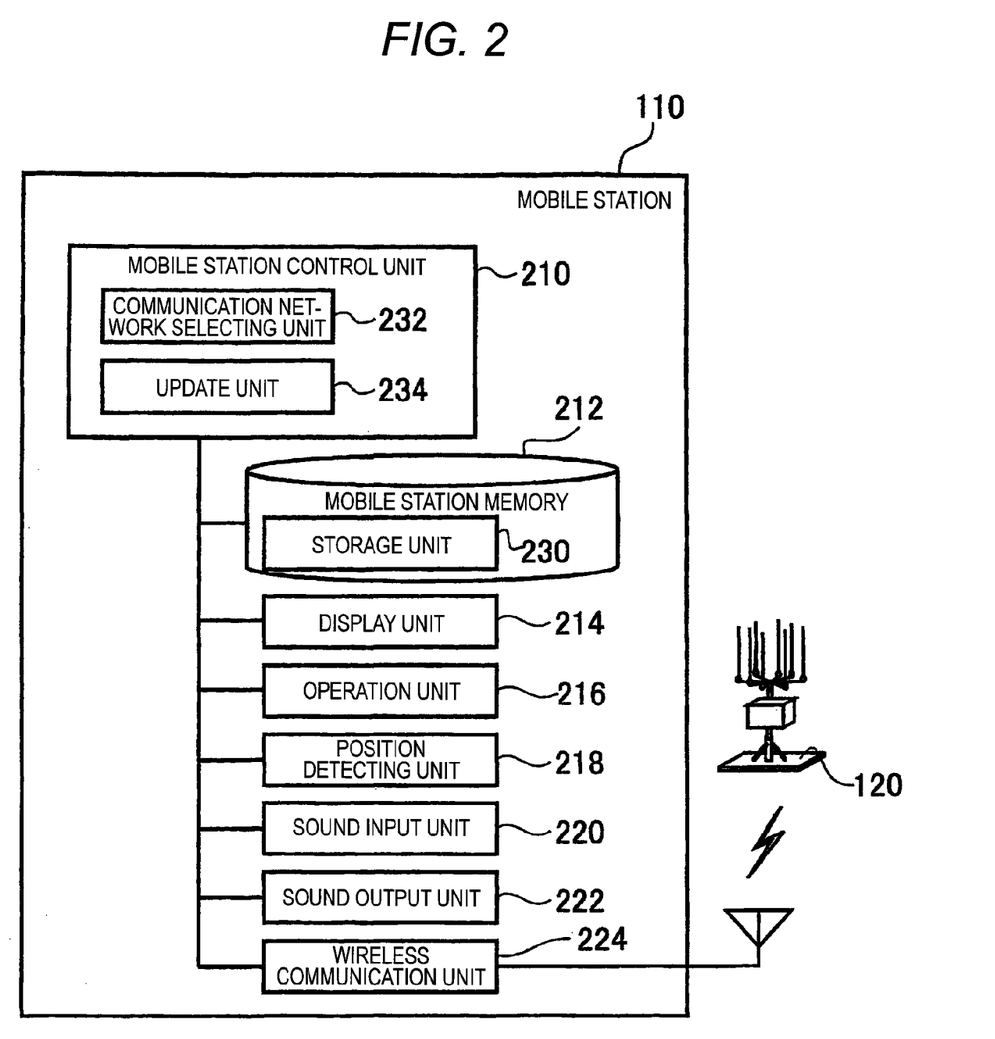
FIG. 2 is a functional block diagram illustrating a configuration of hardware of a mobile station according to an exemplary embodiment.
Figure 3:
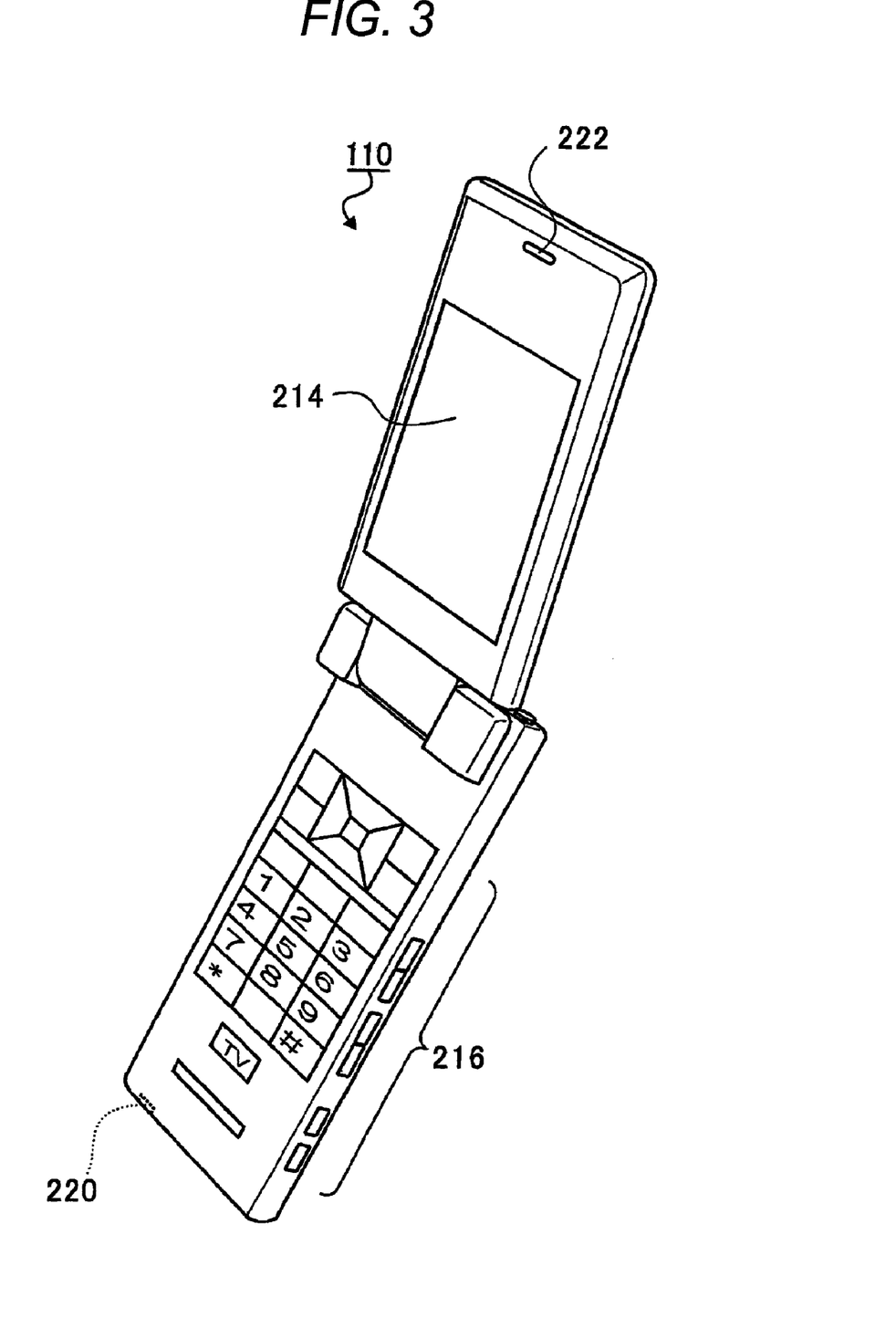
FIG. 3 is a perspective view illustrating an appearance of the mobile station.

FIG. 2 is a functional block diagram illustrating a hardware configuration of the mobile station 110, and FIG. 3 is a perspective view illustrating appearance of the mobile station 110. The mobile station 110 includes a mobile station control unit 210, a mobile station memory 212, a display unit 214, an operation unit 216, a position detecting unit 218, a sound input unit 220, a sound output unit 222, and a wireless communication unit 224.

As a mobile station 110, in addition to mobile communication terminals such as mobile phones and PHS terminals, various electronic apparatuses may be used. For example, a note type personal computer having a wireless connection function to the mobile communication network 100, a Personal Digital Assistants (PDA), a digital camera, a music player, a car navigation system, a game console, and a DVD player.

The mobile station control unit 210 manages and controls the mobile station 110 overall by a semiconductor integrated circuit including a central processing unit (CPU), and performs a phone call function, mail transmission and reception function, an imaging function, a music playing function, and a TV watching function, using programs stored in the mobile station memory 212.

The mobile station memory 212 includes a ROM, a RAM, an EEPROM, a nonvolatile RAM, a flash memory, an HDD, and the like, and stores programs processed in the mobile station control unit 210, communication data, and the like. In addition, the mobile station memory 212 serves also as a storage unit 230 for storing the PRL used when roaming to a mobile communication network other than the contracted specific mobile communication network 100.

The display unit 214 includes a Liquid Crystal Display (LCD), Electro Luminescence (EL) display, or the like, and can display web contents, a Graphical User Interface (GUI) of an applications, and the like, which are stored in the mobile station memory 121 or provided from a web server through the communication network 130. The display unit 214 can display an update state such as the content and progress of the PRL update while the update of the PRL is performed in an update unit 234 to be described later, or can display completion of the PRL update at the time of completing the update of the PRL. A user views the display of such a PRL update, and user can be relieved by confirming that roaming can be normally performed.

The operation unit 216 includes a plurality of operation keys such as a keyboard, a cross key, and a joystick, by which user's operation input is received.

The position detecting unit 218 calculates an absolute position of the mobile station 110, using the existing various methods such as a positioning method based on Global Positioning System (GPS) and a 3-point positioning method from the base station 120. Herein, the 3-point positioning method is a method of calculating an absolute position of a mobile station, from absolute positions of three or more base stations 120 and distances from the base stations 120 derived from propagation delay of transmitted and received radio waves.

The sound input unit 220 includes a sound recognition unit such as a microphone, and converts the user's voice input at the time of a phone call into an electric signal which can be processed in the mobile station 110. The sound output unit 222 includes a speaker, converts a voice signal of the other person receiving the phone call in the mobile station 110 into voice, and outputs the converted voice. In addition, the sound output unit 220 may output a ring, an operation sound of the operation unit 216, an alarm sound, and the like.

The wireless communication unit 224 establishes wireless communication with the base station 120 through a wireless communication method such as Code Division Multiple Access (CDMA) and Worldwide Interoperability for Microwave Access (WiMAX), and performs sound communication with the other person to communicate or data communication with a web server. In addition, the wireless communication unit 224 performs position registration for registering a position of the mobile station 110 in a base station group including a plurality of neighbor base stations 120 to receive a call from other terminals. Such position registration is performed at the time of moving to a neighbor base station group or moving from outside to inside of a communicable range.

The mobile station control unit 210 serves also as a communication selecting unit 232 or an update unit 234.

The communication selecting unit 232 selects a mobile communication network capable of communicating with the mobile station 110 wirelessly, using the PRL stored in the storage unit 230.

The update unit 234 requests update of PRL through the wireless communication unit 224. When the PRL has been changed, the update unit 234 downloads a new PRL, and updates the PRL stored in the storage unit 230 of the mobile station 110. It is possible to recognize whether or not the PRL has been changed, by version information or the like attached to the PRL.

Figure 4A:
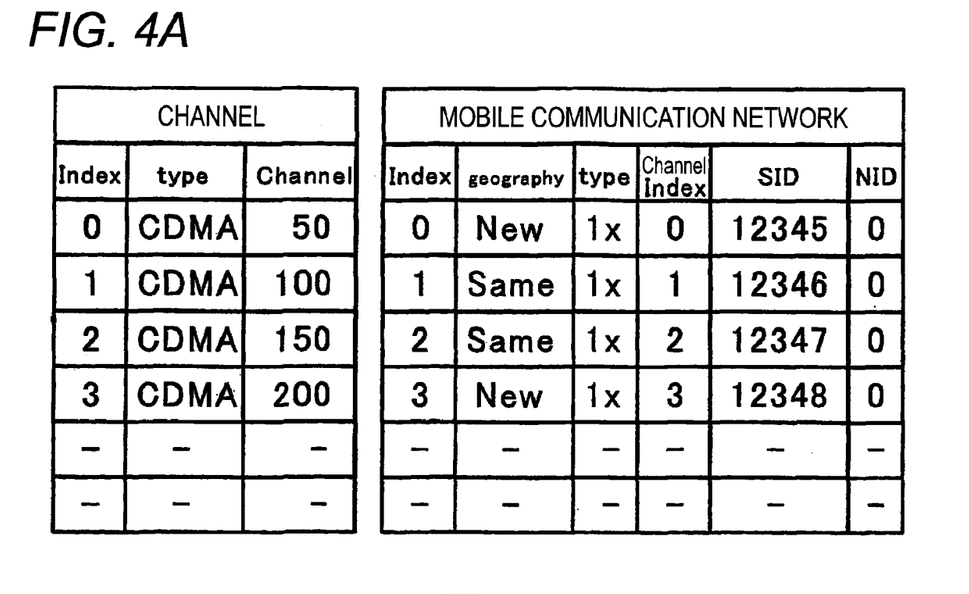
FIGS. 4A and 4B are diagrams illustrating PRL update by an update unit of the mobile station.
Figure 4B:
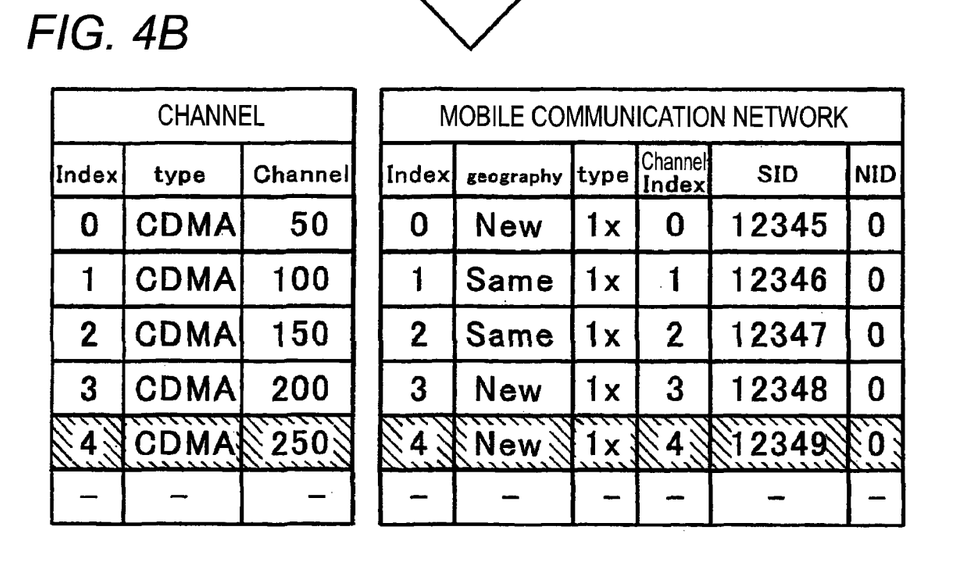

FIGS. 4A and 4B are diagrams illustrating the update of the PRL performed by the update unit 234. As shown in FIG. 4A, the PRL stores parameters for specifying a channel and a mobile communication network while associated with each other by a channel index. When change on the PRL is recognized in the PRL multicast server 150, for example, when a new mobile communication network shown by oblique lines in FIG. 4B is added to the PRL, the new PRL is downloaded and the PRL of the mobile station 110 is replaced by the new PRL.

At the time of the position registration of the mobile station 110, at least the power has been turned on. It may be preferable to perform update of the PRL automatically using a chance of the position registration. When the frequency of the automatic update of PRL increases, the reliability of the update increases. However, when the movement between an outside of service area and an inside service area in low electric-field area is frequent, the automatic update may be frequently performed. In this exemplary embodiment, the PRL is updated when the first position registration at the time of starting the mobile station, that is, at the time of turning the power on.

With such a configuration, it is possible to easily and reliably update the PRL into the latest PRL at the time of using the mobile station without user's manual operation, even when update of the PRL is not performed by turning the power off, at the time of automatic update by BCMCS.

Further, when the position of the mobile station 110 detected by the position detecting unit 218 is within a predetermined area defined in a position table or the like of the mobile station 110, the update unit 234 requests update of the PRL through the wireless communication unit 224, and updates the PRL of the mobile station 110 if the PRL has been changed in the PRL multicast server 150.

Figure 5:
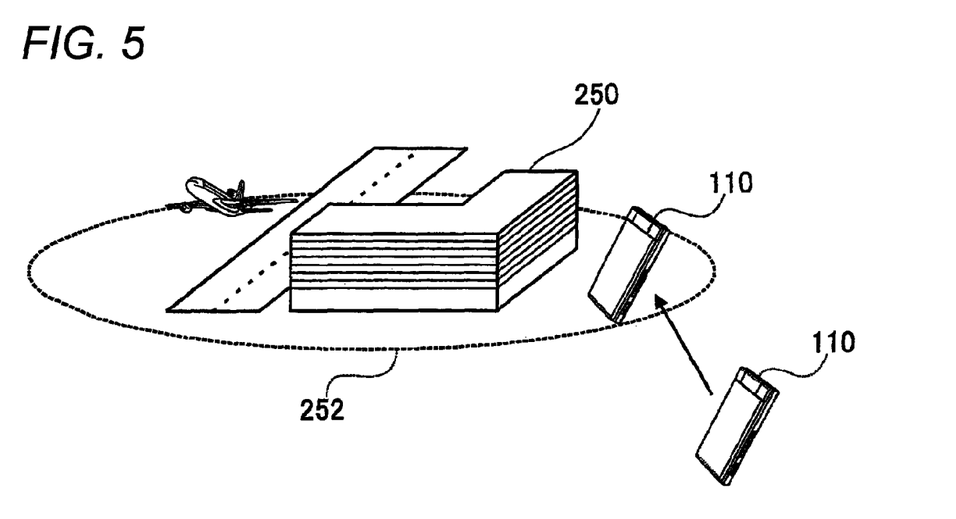
FIG. 5 is a diagram illustrating operation of a position detecting unit and the update unit of the mobile station.

FIG. 5 is a diagram for explaining the operations of the position detecting unit 218 and the update unit 234. The position detecting unit 218 of the mobile station 110 constantly catches the position of the mobile station 110 through a GPS. For example, when the mobile station 110 enters a predetermined area 252 as shown by the arrow, a signal indicating the entering is transmitted to the update unit 234. Then, the update unit 234 performs an update process of the PRL of the mobile station 110.

In this exemplary embodiment, when it is detected that the mobile station 110 is within a predetermined area such as airports, ports, stations, and borders between countries by the position detecting unit 218, the PRL is updated. With such a configuration, it is possible to easily and reliably update the PRL into the latest PRL without the user's manual operation, only by passing through the predetermined area, which is a place to an area requiring roaming, even when the mobile station 110 is not automatically updated by the BCMCS due to any circumstance.

The update unit 234 updates the PRL through the wireless communication unit 224, according to a PRL updating instruction through wireless communication other than the mobile communication network 100. As the wireless communication other than the mobile communication network 100, for example, it is conceivable to use Bluetooth, ZigBee, wireless LAN, infrared communication, near field communication (NFC), and the like.

Figure 6:
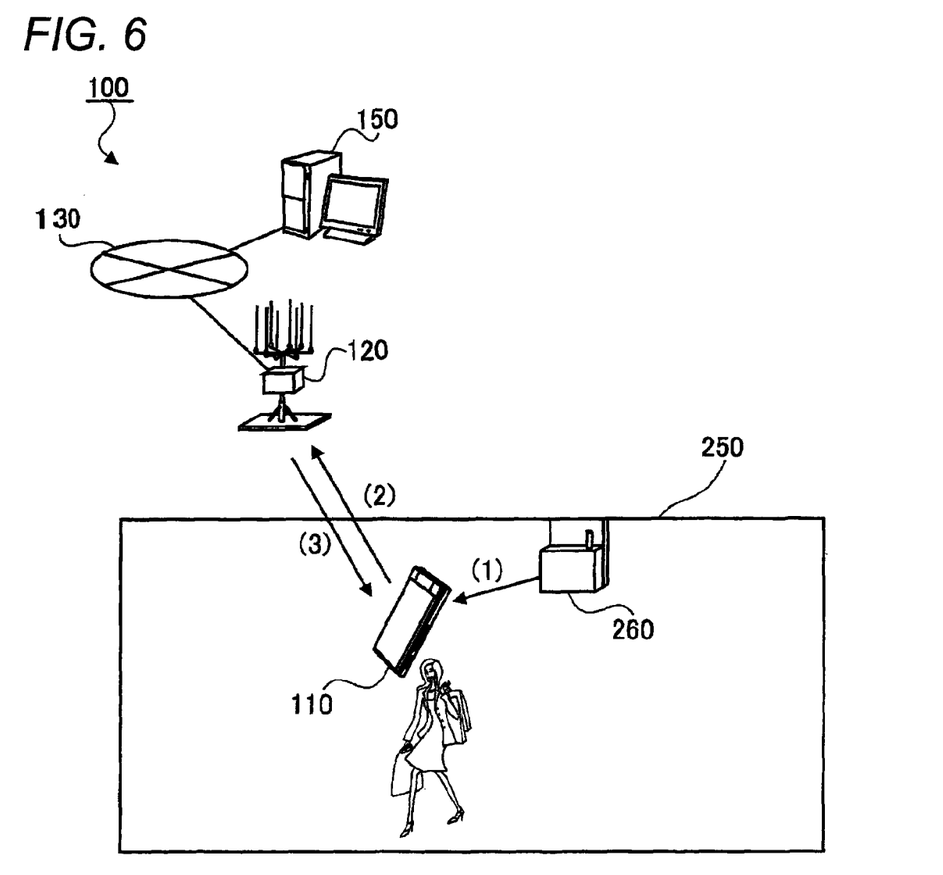
FIG. 6 is a diagram for explaining PRL update through another wireless communication.

FIG. 6 is a diagram for explaining the PRL update through the other wireless communication. When a user with the mobile station 110 enters a predetermined facility such as an airport 250, a PRL updating instruction for forcibly performing update of the PRL is generated from an access point 260 to the mobile station 110, within a communicable range of the access point 260 of Bluetooth (1), for example. The mobile station 110 receiving such a PRL updating instruction requests the PRL multicast server 150 to update the PRL (2), and the mobile station 110 updates the PRL thereof by the PRL transmitted from the PRL multicast server 150 (3).

Recently, the demand of the above-described wireless communication has increased, and such wireless communication receives a lot of attention as a paperless identification system. Accordingly, when the update of PRL is promoted by applying such wireless communication provided at predetermined facilities such as airports, ports, stations, and borders between countries, it is possible to easily and reliably update the PRL into the latest PRL without the user's manual operation.

In this exemplary embodiment, the PRL is acquired from the original mobile communication network 100 in response to the instruction transmitted through the other wireless communication, but the present invention is not limited thereto. The PRL may be directly acquired through the other wireless communication.

Further, if the mobile station 110 has an imaging function, the PRL updating instruction may be received by imaging a 2D code or the like.

As described above, in this exemplary embodiment, once the user enters the predetermined area such as the airport 250, the user can receive the update service of the PRL. However, the time or the frequencies of the update cannot be controlled by the mobile station 110. Accordingly, the mobile station 110 might receive such a PRL updating instruction continuously, as long as the mobile station 110 is within a communicable range of the other wireless communication. That is, even when the latest PRL has been updated already, the update process has to be performed for every predetermined update time (e.g., 30 minutes).

Thus, when the change time of the PRL in the PRL multicast server 150 is previously known, once the update process is performed in the airport 250 or the like, the update process may not be performed again in the same predetermined area or the same wireless communication, unless passing over the change time. After the update process is performed once, a new update process of a predetermined time, for example, two hours may also not be performed using a timer or the like. In other words, the update unit 234 does not update the roaming list of the mobile station 110 even when receiving the PRL updating instruction within a predetermined time period from a last update of the roaming list of the mobile station 110.

The update unit 234 requests update of PRL through the wireless communication unit 224 according to a user input for changing into the off-line mode (communication impossible mode) or power off. In the off-line mode, the power of the mobile station 110 is on, but wireless communication function is off. When the PRL has been changed in the PRL multicast server 150, the PRL of the mobile station 110 is updated. Then, after the download of the PRL is completed, off-line mode switching is performed or power of the mobile station 110 is off.

In a circumstance where communication function is obligatorily off or power is obligatorily turned off such as a case of boarding an airplane, the PRL can be updated in response to a user input for changing into the off-line mode. With such a configuration, it is possible to easily and reliably update the PRL into the latest PRL without the user's manual operation, when boarding or getting off airplanes or the like which requires roaming, even when the mobile station is not automatically updated by the BCMCS due to any circumstance.

(Wireless Communication Method)

Next, a wireless communication method for automatically updating the PRL to perform roaming between mobile communication networks.

Figure 7:
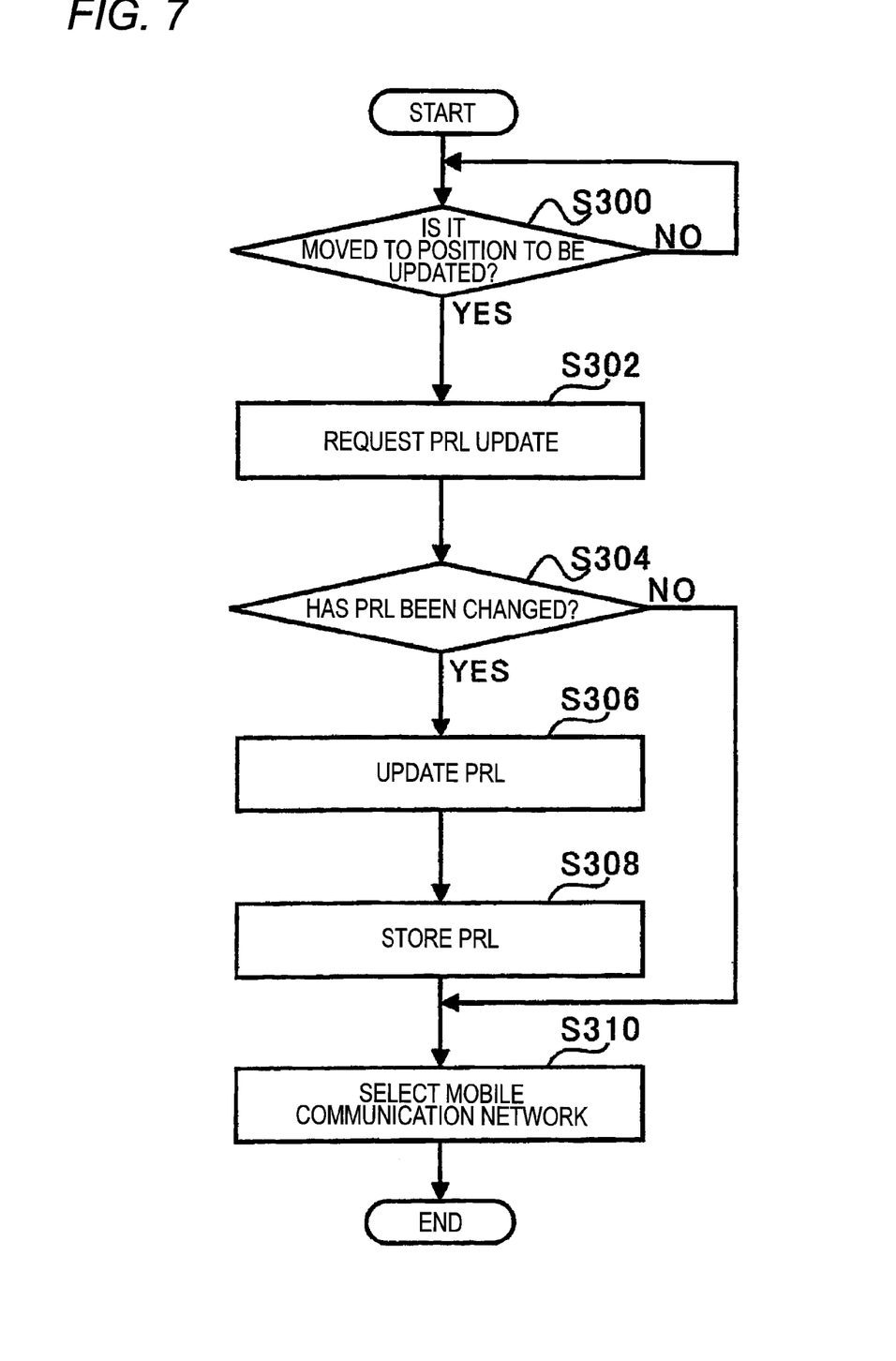
FIG. 7 is a flowchart illustrating processes of a wireless communication method according to an exemplary embodiment.

FIG. 7 is a flowchart illustrating processes of a wireless communication method. When a user moves into a place to an area requiring roaming to a mobile communication network other than the specific mobile communication network 100 contracted with the user, for example, airports, ports, stations, and borders between countries (S300), the wireless communication unit 224 of the mobile station 110 establishes wireless communication with the base station 120 in response to any trigger occurring due to the mobile station 110 locating there, for example, position coincidence, entering into communicable range of predetermined wireless communication, switching to the off-line mode, and the like (S302).

If the PRL has been changed in the PRL multicast server 150 (or on the mobile communication network) (S304), the PRL of the mobile station 110 is updated (S306) and the PRL is stored in the storage unit 230 (S308). Then, when the mobile station 110 is moved to an area requiring roaming, the mobile station 110 selects a mobile communication network capable of communicating with the mobile station 110 wirelessly, using the PRL stored in the storage unit 230 (S310).

Even by such a wireless communication method, it is possible to easily and reliably update the roaming list in a circumstance where the power of the mobile station needs to be turned on or roaming is necessary, so that a roaming service can be normally received.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiment, the PRL is updated in response to all triggers of turning power on, position coincidence, entering into communicable range of predetermined wireless communication, and switching to the off-line mode. However, the PRL may be updated in response to only one, two, or more trigger selected from the above-described group. The triggers of such PRL update may be individually set by a user.

Each process in the wireless communication method of the specification is not necessarily performed in time series according to the order described as the flowchart, and may include a parallel process or a process based on subroutine.

The present invention can be applied to a mobile station capable of roaming between mobile communication networks, and a wireless communication method.

What is claimed is:

1. A mobile station comprising:
   a wireless communication unit which establishes wireless communication with a base station;
   a storage unit which stores a roaming list used when roaming to a mobile communication network other than a specific mobile communication network of a communication carrier contracted with the mobile station;
   a communication network selecting unit which selects a mobile communication network with which the mobile station is capable of communicating wirelessly, by using the roaming list; and
   an update unit which requests update of the roaming list through the specific mobile communication network of the communication carrier contracted with the mobile station by the wireless communication unit at a time of starting the mobile station, and updates the roaming list stored in the storage unit if changed, wherein the update unit requests update of the roaming list in response to one or more triggers individually set by a user of said mobile station.

2. The mobile station according to claim 1, wherein the update unit updates the roaming list of the mobile station at a time of position registration when starting the mobile station.

3. A mobile station comprising:
   a wireless communication unit which establishes wireless communication with a base station;
   a storage unit which stores a roaming list used when roaming to a mobile communication network other than a specific mobile communication network of a communication carrier contracted with the mobile station;
   a communication network selecting unit which selects a mobile communication network with which the mobile station is capable of communicating wirelessly, by using the roaming list;
   a position detecting unit which detects a position of the mobile station; and
   an update unit which requests update of the roaming list through the specific mobile communication network of the communication carrier contracted with the mobile station by the wireless communication unit at a time of detecting that the position of the mobile station is within a predetermined area which is in the specific mobile communication network of the communication carrier contracted with the mobile station, and updates the roaming list stored in the storage unit if changed, wherein the update unit requests update of the roaming list in response to one or more triggers individually set by a user of said mobile station.

4. A mobile station comprising:
   a wireless communication unit which establishes wireless communication with a base station;
   a storage unit which stores a roaming list used when roaming to a mobile communication network other than a specific mobile communication network of a communication carrier contracted with the mobile station;
   a communication network selecting unit which selects a mobile communication network with which the mobile station is capable of communicating wirelessly, by using the roaming list; and
   an update unit which updates the roaming list stored in the storage unit through the specific mobile communication network of the communication carrier contracted with the mobile station by the wireless communication unit in response to a roaming list updating instruction received through wireless communication other than from the specific mobile communication network, wherein the update unit requests update of the roaming list in response to one or more triggers individually set by a user of said mobile station.

5. The mobile station according to claim 4, wherein the update unit does not update the roaming list in the storage unit when receiving the roaming list updating instruction within a predetermined time period from a last update of the roaming list in the storage unit.

6. The mobile station according to claim 4, wherein the wireless communication other than from the specific mobile communication includes at least one of a Bluetooth protocol, a Zigbee protocol, a wireless LAN, an infrared communication, and near field communication.

7. The mobile station according to claim 4, wherein the roaming list is received directly through the specific mobile communication network.

8. The mobile station according to claim 4, wherein the roaming list is received using the wireless communication other than from the specific mobile communication network.

9. A mobile station comprising:
   a wireless communication unit which establishes wireless communication with a base station;
   a storage unit which stores a roaming list used when roaming to a mobile communication network other than a specific mobile communication network of a communication carrier contracted with the mobile station;
   a communication network selecting unit which selects a mobile communication network with which the mobile station is capable of communicating wirelessly, by using the roaming list; and an update unit which requests update of the roaming list through the specific mobile communication network of the communication carrier contracted with the mobile station by the wireless communication unit in response to a user input for changing into an off-line mode, and updates the roaming list stored in the storage unit if changed, wherein the update unit requests update of the roaming list in response to one or more triggers individually set by a user of said mobile station.

10. A wireless communication method comprising:

detecting a passing of a mobile station through a place to an area requiring roaming to a mobile communication network other than a specific mobile communication network of a communication carrier contracted with the mobile station;

requesting a base station to update a roaming list used when roaming to a mobile communication network through the specific mobile communication network of the communication carrier contracted with the mobile station by a wireless communication unit of the mobile station which establishes wireless communication with the base station when the passing is detected;

updating a roaming list of the mobile station if changed, wherein updating of the roaming list is in response to one or more triggers individually set by a user of said mobile station;

storing the updated roaming list; and selecting a mobile communication network with which the mobile station is capable of communicating wirelessly, by using the stored roaming list at a time of roaming.

11. A non-transitory computer-readable medium having a computer program stored thereon and readable by a computer installed in a mobile station, the computer program, when executed by the computer, causes the computer to perform operations comprising:

establishing wireless communication with a base station;

storing a roaming list used when roaming to a mobile communication network other than a specific mobile communication network of a communication carrier contracted with the mobile station;

selecting a mobile communication network with which the mobile station is capable of communicating wirelessly, by using the roaming list; and performing at least one of the following operations comprising:

(a) requesting update of the roaming list at a time of starting the mobile station from the power-off state of the mobile station through the specific mobile communication network of the communication carrier contracted with the mobile station, and updating the roaming list if changed, wherein updating of the roaming list is in response to one or more triggers individually set by a user of said mobile station;

(b) detecting a position of the mobile station, requesting update of the roaming list through the specific mobile communication network of the communication carrier contracted with the mobile station at a time of detecting that the position of the mobile station is within a predetermined area which is in the specific mobile communication network of the communication carrier contracted with the mobile station, and updating the roaming list if changed, wherein updating of the roaming list is in response to one or more triggers individually set by a user of said mobile station;

(c) updating the roaming list through the specific mobile communication network of the communication carrier contracted with the mobile station in response to a roaming list updating instruction through wireless communication other than the mobile communication network, wherein updating of the roaming list is in response to one or more triggers individually set by a user of said mobile station; and (d) requesting update of the roaming list through the specific mobile communication network of the communication carrier contracted with the mobile station in response to a user input for changing into an off-line mode, and updating the roaming list if changed, wherein updating of the roaming list is in response to one or more triggers individually set by a user of said mobile station.

* * * * *